(12) United States Patent
Kobayashi et al.

(10) Patent No.: US 7,321,214 B2
(45) Date of Patent: Jan. 22, 2008

(54) MOTOR CONTROL SYSTEM

(75) Inventors: Shigeru Kobayashi, Toyohashi (JP); Keizo Ishizu, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/591,512

(22) Filed: Nov. 2, 2006

(65) Prior Publication Data

US 2007/0103820 A1  May 10, 2007

(30) Foreign Application Priority Data

Nov. 7, 2005  (JP)  ............................. 2005-322459
Aug. 25, 2006  (JP)  ............................. 2006-229611

(51) Int. Cl.
*H02P 1/04*  (2006.01)

(52) U.S. Cl. ...................... 318/471; 318/470; 388/800; 388/831; 361/25; 361/33; 713/320; 714/51; 714/55

(58) Field of Classification Search ........ 318/470–473; 388/800, 831; 361/25, 33; 713/320; 714/51, 714/55

See application file for complete search history.

(56) References Cited

U.S. PATENT DOCUMENTS 6,094,026 A * 7/2000 Cameron ..................... 318/471
6,321,029 B1 * 11/2001 Kuo ............................. 388/800
6,490,699 B2 * 12/2002 Nishibe et al. ................ 714/55
6,854,064 B2 * 2/2005 Ahn ............................. 713/300
6,880,096 B2 * 4/2005 Sumida ....................... 713/320
6,900,607 B2 * 5/2005 Kleinau et al. .............. 318/432
7,071,649 B2 * 7/2006 Shafer et al. ............... 318/783
7,199,549 B2 * 4/2007 Kleinau et al. .............. 318/798
2003/0071594 A1 * 4/2003 Kleinau et al. .............. 318/567
2003/0076061 A1 * 4/2003 Kleinau et al. .............. 318/432
2003/0076064 A1 * 4/2003 Kleinau et al. .............. 318/567
2003/0076065 A1 * 4/2003 Shafer et al. ............... 318/567
2006/0101605 A1 * 5/2006 Fujiwara ....................... 15/319

FOREIGN PATENT DOCUMENTS

JP  U6-49074  12/1994
JP  A-11-164472  6/1999

* cited by examiner

*Primary Examiner*—Paul Ip
(74) *Attorney, Agent, or Firm*—Posz Law Group, PLC

(57) ABSTRACT

A controller is operable in one of a plurality of operational modes, which include an estimated temperature computation performing mode for performing computing of an estimated temperature of the motor and an estimated temperature computation non-performing mode for stopping the computing of the estimated temperature of the motor. An operational mode of the controller is changed from the estimated temperature computation performing mode to the estimated temperature computation non-performing mode according to a predetermined condition in a stopped state of the motor.

7 Claims, 7 Drawing Sheets

ACTIVE MODE

FIG. 5B

FIRST SLEEP MODE

FIG. 5C

SECOND SLEEP MODE

MOTOR CONTROL SYSTEM

CROSS REFERENCE TO RELATED APPLICATION

This application is based on and incorporates herein by reference Japanese Patent Application No. 2005-322459 filed on Nov. 7, 2005 and Japanese Patent Application No. 2006-229611 filed on Aug. 25, 2006.

BACKGROUND OF THE INVENTION

1. Field of the Invention

The present invention relates to a motor control system.

2. Description of Related Art

Previously, a protective device, such as a bimetal or a PTC thermistor, is provided in a housing of a motor to protect the motor from burnout. When the motor generates an abnormally high heat, the protective device shuts down an electric circuit to stop supply of the electric power to the motor.

When the protective device is provided to the motor, a size of the motor is disadvantageously increased to cause an increase in a size of the entire system. Thus, in a motor control system, which is disclosed in Japanese Unexamined Patent Publication No. H11-164472, the above protective device is not provided, and a control apparatus, which controls an operation of the motor, computes an estimated temperature of the motor based on a voltage applied to the motor and an application time for applying the voltage to the motor in view of a previously estimated temperature value.

In a vehicle, various electric devices are installed, so that a load of a vehicle battery, which supplies the electric power to these devices, is relatively high. Therefore, there is an increasing demand for reducing the power consumption of these electric devices installed in the vehicle.

However, in the motor control system, which computes the estimated temperature of the motor, the accurate estimated temperature is required at the time of restarting the motor even after turning off of the ignition switch upon stopping of the motor. Thus, the computing operation for computing the estimated temperature needs to be continuously performed. Thus, even though the motor is stopped, a microcomputer of the motor control system needs to continuously perform the computing operation of the estimated temperature and thereby always consumes the electric power of the vehicle battery.

SUMMARY OF THE INVENTION

The present invention addresses the above disadvantages. Thus, it is an objective of the present invention to provide a motor control system, which reduces an electric power consumption thereof.

To achieve the objective of the present invention, there is provided a motor control system, which includes a motor, a control apparatus and an ambient temperature sensing apparatus. The motor is powered by an electric power supplied from a vehicle electric power source. The control apparatus controls an operation of the motor. The ambient temperature sensing apparatus senses an ambient temperature around the motor. The control apparatus includes an estimated temperature computing means for computing an estimated temperature of the motor. The estimated temperature computing means is operable in one of a plurality of operational modes, which include an estimated temperature computation performing mode for performing the computing of the estimated temperature of the motor and an estimated temperature computation non-performing mode for stopping the computing of the estimated temperature of the motor. The estimated temperature computing means changes an operational mode thereof from the estimated temperature computation performing mode to the estimated temperature computation non-performing mode according to a predetermined condition in a stopped state of the motor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
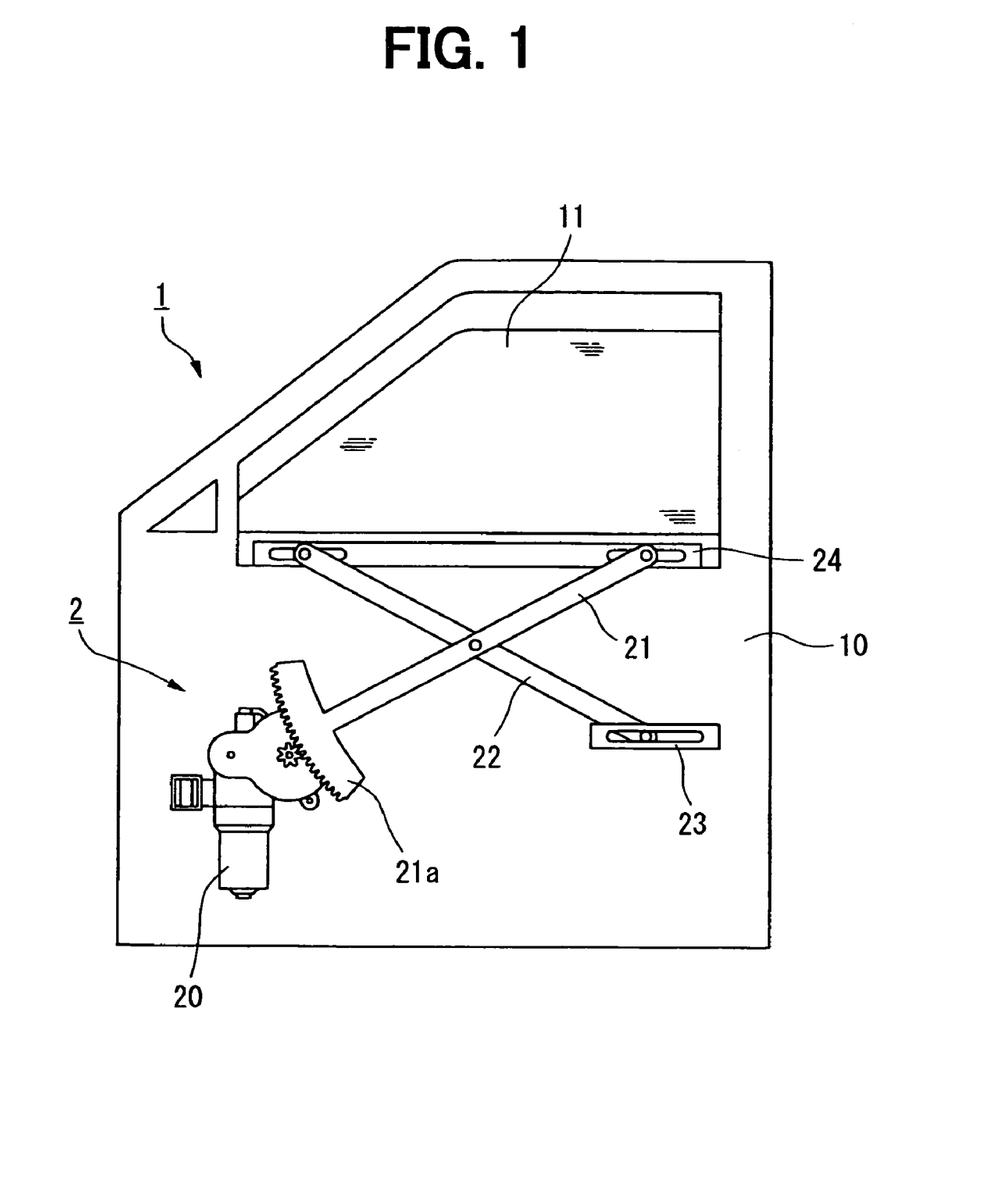
FIG. 1 is a diagram for describing a power window system according to a first embodiment of the present invention.
Figure 2:
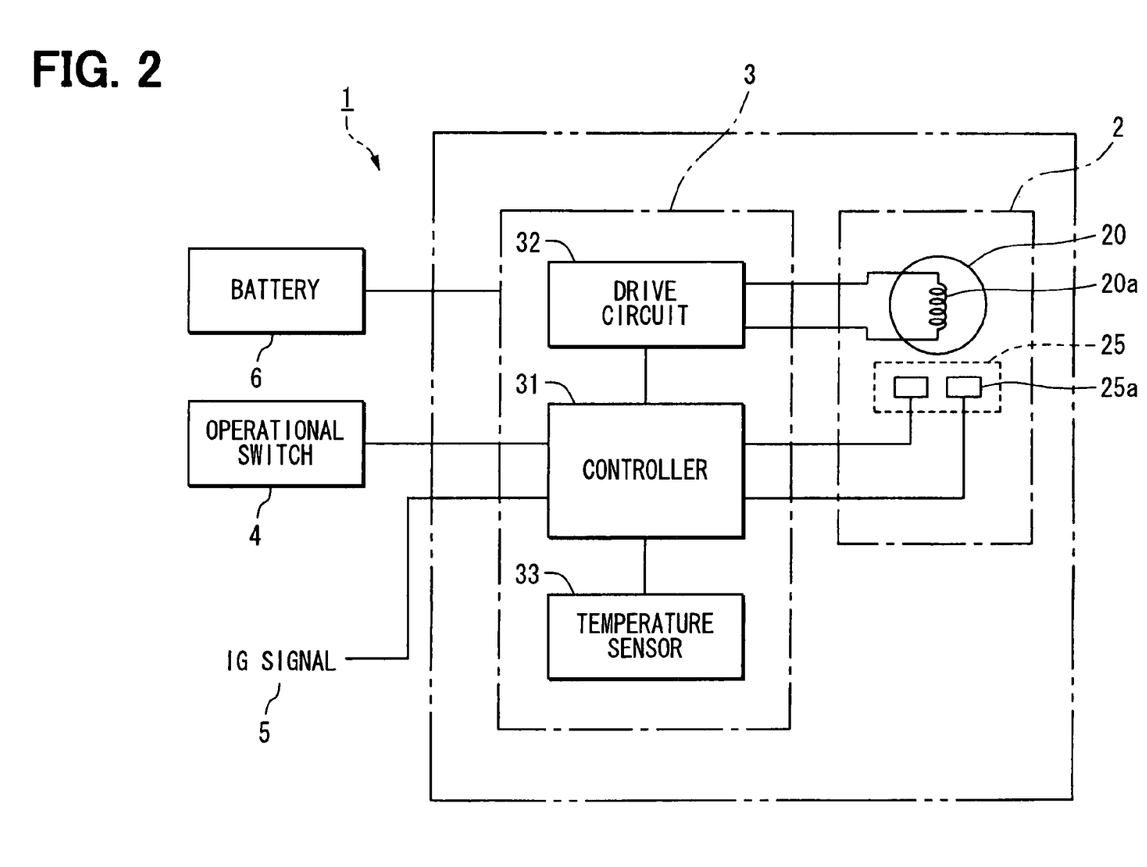
FIG. 2 is a diagram showing an electric structure of the power window system of FIG. 1.

A first embodiment, in which a motor control system of the present invention is implemented in a vehicle power window system, will be described. FIG. 1 is a descriptive view of the power window system 1 (hereinafter, simply referred to as "system 1"), and FIG. 2 is a diagram showing an electric structure of the system 1. In the system 1, a window glass 11, which is a movable member arranged in a door 10 of a vehicle, is raised and lowered, i.e., closed and opened by an electric motor 20. The system 1 includes a lifting mechanism 2, a control apparatus 3 and a operational switch 4. The lifting mechanism 2 raises and lowers the window glass 11. The control apparatus 3 controls operation of the lifting mechanism 2. A vehicle occupant inputs an operational command for operating the lifting mechanism 2 through the operational switch 4.

The window glass 11 is vertically driven between a fully closed position (a full up position) and a full open position (a full down position) along a rail (not shown).

The lifting mechanism 2 includes the motor 20, a lifting arm 21, a driven-side arm 22, a stationary channel 23 and glass-side channels 24. The motor 20 is fixed to the door 10 and includes a speed reducing mechanism. The lifting arm 21 includes a fan-shaped gear 21a, which is driven by the motor 20. The driven-side arm 22 is connected with the lifting arm 21 in a criss-cross like fashion and is pivotably supported. The stationary channel 23 is fixed to the door 10. The glass-side channels 24 are integral with the window glass 11.

When the control apparatus 3 supplies the electric power to the motor 20, a winding 20a of a rotor of the motor 20 is energized, so that a magnetic attractive action occurs between the rotor and a stator having magnets in the motor 20. As a result, the rotor rotates in a normal direction or a reverse direction. In the lifting mechanism 2, when the motor 20 is driven, the lifting arm 21 and the driven-side arm 22 are swung. At this time, movement of corresponding ends of the lifting arm 21 and of the driven-side arm 22 are limited by the channels 23, 24, so that the lifting arm 21 and the driven-side arm 22 function as an X-linkage to raise or lower the window glass 11.

The motor 20 includes a rotation sensing device (a position sensing device) 25. The rotation sensing device 25 outputs a pulse signal, which is synchronized with the rotation of the motor 20, to the control apparatus 3. The rotation sensing device 25 includes a plurality of Hall elements 25a to sense a change in magnetism of a magnet, which rotates integrally with an output shaft of the motor 20.

The control apparatus 3 computes a vertical position of the window glass 11 based on the pulse signal received from the rotation sensing device 25. The control apparatus 3 can compute a rotational speed of the motor 20 as well as a vertical moving speed of the window glass 11 based on intervals between the corresponding pulse signals.

In the present embodiment, although the Hall elements are used in the rotation sensing device 25, an encoder may be alternatively used as long as it can sense the rotational speed of the motor 20. Furthermore, in the present embodiment, in order to sense the rotational speed of the output shaft of the motor 20, which corresponds to the vertical movement of the window glass 11, the rotation sensing device 25 is provided integrally in the motor 20. However, the present invention is not limited to this, and any other known technique or device may be alternatively used to sense the moving speed of the window glass 11.

The control apparatus 3 includes a controller 31, a drive circuit 32 and a temperature sensor 33, which are arranged on a circuit board. These devices are powered by a battery of the vehicle (a vehicle electric power source).

Normally, the controller 31 rotates the motor 20 in the normal direction or the reverse direction through the drive circuit 32 based on an operational signal received from the operational switch 4 to raise or lower the window glass 11. Furthermore, the controller 31 receives a signal, which indicates an electric power state of the vehicle (e.g., an operational state of an engine or a power generating state of an alternator). For example, in the present embodiment, the controller 31 receives an ignition (IG) signal 5, which is a signal that indicates the electric power state of the vehicle.

When an ignition switch, (not shown) is switched on or off, the controller 31 receives the IG signal 5 directly from the ignition switch or indirectly from, for example, an ECU. When the IG signal 5 is an ON signal, the electric power state of the vehicle is in an ON state. In contrast, when the IG signal 5 is an OFF signal, the electric power state of the vehicle is in an OFF state.

Here, "the ON state of the electric power sate of the vehicle" refers to a state where the electric power is generated through the operation of the engine, so that the battery 6 is further charged, and the devices of the vehicle are enabled to receive the electric power from the battery 6. In contrast, "the OFF state of the electric power sate of the vehicle" refers to a state where the electric power is not generated through the operation of the engine, so that the battery 6 is not further charged, and the devices of the vehicle are enabled to receive the electric power from the battery 6.

Figure 3:
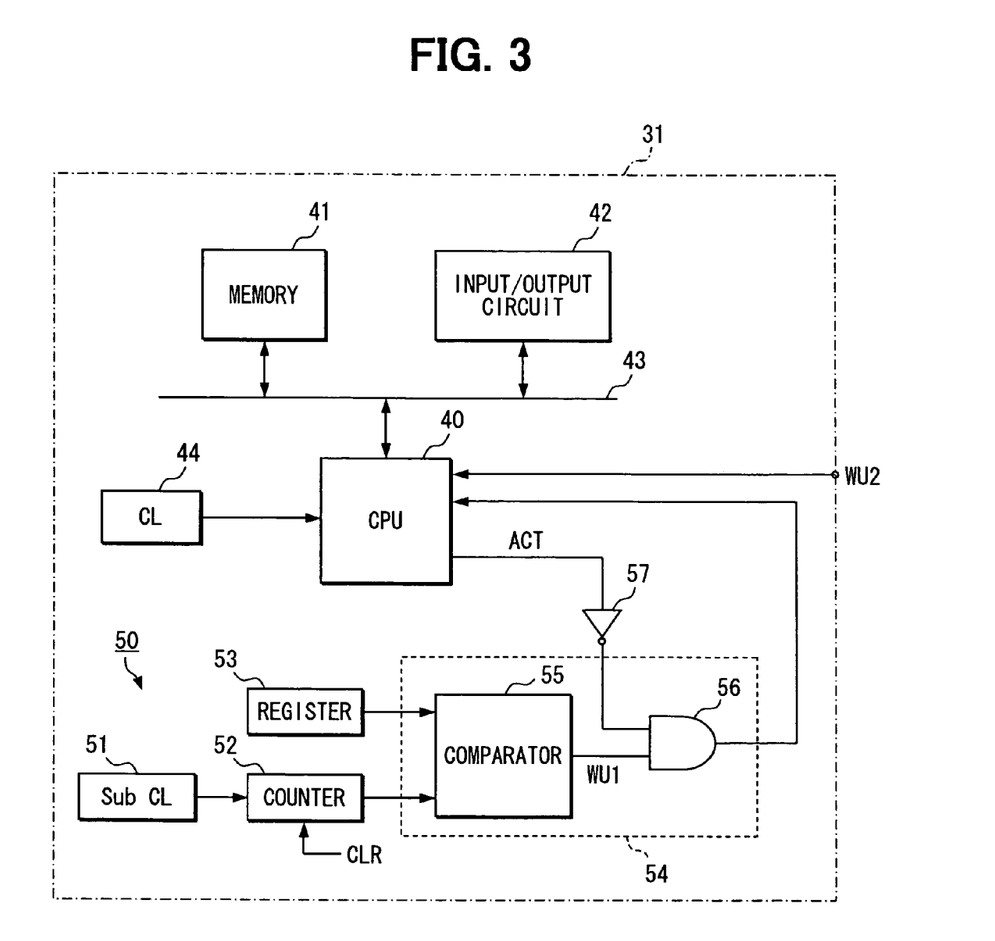
FIG. 3 is a diagram showing an electric structure of a controller shown in FIG. 2.

As shown in FIG. 3, the controller 31 is a microcomputer, which includes a CPU 40, a memory 41 (e.g., a ROM, a RAM), an input/output circuit 42, a sleep control circuit 50. The CPU 40 is interconnected with the memory 41, the input/output circuit 42 and the sleep control circuit 50 through a bus 43. The memory 41 stores various operational programs and data, which are used by the CPU 40.

The drive circuit 32 includes an IC, which has FETs. The drive circuit 32 switches a polarity of the electric current supplied to the motor 20 based on a control signal received from the controller 31. Specifically, when the drive circuit 32 receives a normal rotation command from the controller 31, the drive circuit 32 supplies the electric power to the motor 20 in a manner that causes the rotation of the motor 20 in the normal rotational direction. In contrast, when the drive circuit 32 receives a reverse rotation command from the controller 31, the drive circuit 32 supplies the electric current to the motor 20 in a manner that causes the rotation of the motor 20 in the reverse rotational direction. Alternative to the FETs, the drive circuit 32 may include a relay circuit to change the polarity. Furthermore, the drive circuit 32 may be integrated in the controller 31.

The temperature sensor 33 senses an ambient temperature around the circuit board, on which the controller 31 is provided. In the present embodiment, the temperature sensor 33 is spaced from the motor 20.

The controller 31 receives an ambient temperature measurement signal from the temperature sensor 33 and computes an ambient air temperature (ambient temperature) around the circuit board. The temperature sensor 33 and the controller 31 correspond to an ambient temperature sensing apparatus of the present invention. Alternatively, the temperature sensor 33 alone may correspond to the ambient temperature sensing apparatus of the present invention.

Furthermore, the controller 31 counts an applied voltage, which is applied to the motor 20 through the drive circuit 32, and its energization time (i.e., a time period of applying the voltage to the motor 20, that is, a consecutive operation time of the motor 20). Furthermore, the controller 31 monitors the rotational speed of the motor 20 based on the pulse signals received from the rotation sensing device 25.

Also, the controller 31 stores an estimated temperature (an estimated motor temperature) of the winding 20a in the temperature counter, which is an estimated temperature storage means and is set in the memory 41. Furthermore, the memory 41 stores reference data, which is used to compute this estimated temperature. The controller 31, which serves as an estimated temperature computing means, computes an amount of change (a correction value) in the estimated temperature during the motor operation based on the ambient temperature, the applied voltage, the energization time (the consecutive operation time), the rotational speed and the reference data. Then, the controller 31 adds this amount of change to the current estimated temperature to compute a new estimated temperature. Normally, the computing operation of this estimated temperature is repeated every time a recursive operation time elapses, i.e., is repeated at predetermined operation cycles.

In the present embodiment, the estimated temperature of the winding 20a is computed. However, the present invention is not limited to this. For example, the estimated temperature of the entire motor 20 may be alternatively computed.

When the estimated temperature exceeds a predetermined temperature, the controller 31 stops the supply of the electric power from the drive circuit 32 to prevent the burnout of the winding 20a. As described above, in the system 1, the supply of the electric power is stopped based on the estimated temperature of the winding 20a, which is computed by the controller 31, so that the winding 20a is protected from the burnout. Therefore, it is not required to provide the relatively large protective device, such as the bimetal or the PTC thermistor, in the main body of the motor 20 to measure the winding temperature. As a result, the motor 20 can be downsized.

Furthermore, the controller 31, which serves as the estimated temperature computing means, stores subtractive temperature data in the memory 41 to perform the computing operation of the estimated temperature during the motor stop period (i.e., in the stopped state of the motor 20). The subtractive temperature data defines a relationship between a subtractive temperature $\Delta T$ ($\Delta T1$, $\Delta T2$) per predetermined unit time and the current value (the estimated temperature) of the temperature counter.

Specifically, in the present embodiment, during the motor stop period, the value of the temperature counter is reduced based on the subtractive temperature $\Delta T$ every time the predetermined time elapses. In this way, during the motor stop period, the value of the temperature counter is finally reduced to the ambient temperature, which is computed based on the ambient temperature measurement signal outputted from the temperature sensor 33.

Figure 4:
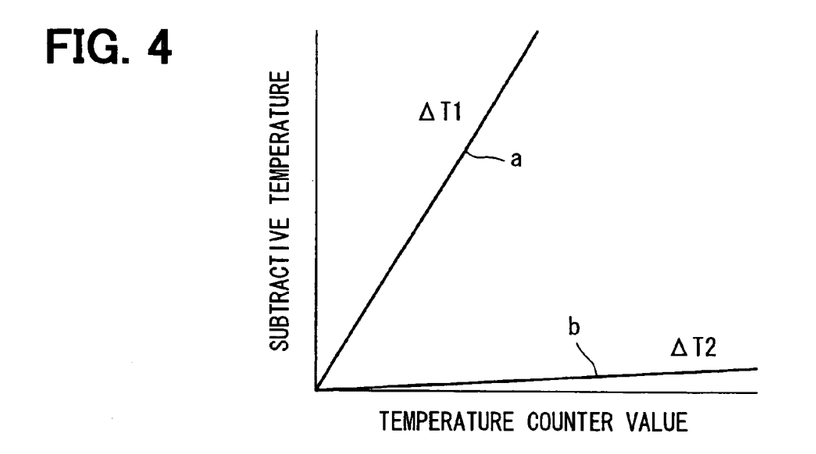
FIG. 4 is a diagram showing a relationship between a subtractive temperature and a temperature counter value during a motor stop period.

FIG. 4 shows the subtractive temperature data. In FIG. 4, the subtractive temperature data "a" corresponds to the subtractive temperature $\Delta T1$, and the subtractive temperature data "b" corresponds to the subtractive temperature $\Delta T2$. In the present embodiment, as will be described below, the controller 31 is operable in one of an active mode (a normal operational mode) and a sleep mode (a low power consumption operational mode). In the sleep mode, the power consumption is lower than that of the active mode.

In the active mode (FIG. 5A), the temperature counter is renewed every time the predetermined recursive operation time elapses. The subtractive temperature data "b" is set as the amount of temperature decrease that occurs during this predetermined recursive operation time with respect to the respective value of the temperature counter.

In the sleep mode, first and second sleep modes exist. In the first sleeve mode (FIG. 5B), the temperature counter is renewed every sleep cycle P, which is a sum of a sleep time Ts (e.g., 10 seconds) and an active time Ta (e.g., 4 milliseconds). In the sleep time Ts, the controller 31 is placed in the sleep state. In the active time Ta, the controller 31 is placed in the active state.

The subtractive temperature data "a" is set as the amount of temperature decrease that occurs during this sleep cycle P with respect to the respective value of the temperature counter. Thus, in FIG. 4, a slope of the subtractive temperature data "a" is larger than a slope of the subtractive temperature data "b".

As described above, in the computing operation of the estimated temperature in the first sleep mode, the correction value (the subtractive temperature) is computed, and the value of the temperature counter is renewed (reduced) by subtracting the correction value from the value of the temperature counter. Thus, this computing operation can be carried out at the relatively low load level.

In the second sleep mode (FIG. 5C), the controller 31 is always in the sleep state, so that the renewal operation for renewing the estimated temperature is not performed. In the present embodiment, as will be described latter, the operation is changed from the first sleep mode to the second sleep mode when the estimated temperature drops to have a relatively small temperature difference, which is equal to or less than a predetermined value (a predetermined temperature difference), with respect to the ambient temperature, and thereby the estimated temperature is considered as substantially the same as the ambient temperature.

In the second sleep mode, the ambient temperature, which is measured with the temperature sensor 33, can be regarded as the estimated temperature. Thus, there is no need to perform the renewing operation for renewing the estimated temperature every time the predetermined time elapses.

Furthermore, in the present embodiment, at the time of returning from the second sleep mode to the active mode, the ambient temperature is used as the estimated temperature, and thereafter the proceeding renewing operation for renewing the estimated temperature is carried out based on this estimated temperature.

As described above, in the present embodiment, even in the state where the controller 31 is operated in the sleep mode, the computing operation for computing the estimate motor temperature is executed every time the predetermined time elapses, or alternatively the estimate motor temperature is regarded as substantially the same as the ambient temperature. Therefore, the appropriate motor temperature is always obtainable.

As a result, according to the present embodiment, in the first sleep mode, the power consumption is at the relatively low level. Furthermore, in the second sleep mode, the power consumption is further reduced in comparison to that of the first sleep mode, and the motor temperature can be relatively accurately obtained by regarding the motor temperature as substantially the same as the ambient temperature.

In the case of FIG. 4, the subtractive temperature data "a" and the subtractive temperature data "b" are approximated by using a linear function. Alternatively, a corresponding high dimensional function may be used for each of a plurality of temperature ranges to approximate the subtractive temperature data "a" and the subtractive temperature data "b".

Furthermore, in the present embodiment, the subtractive temperature $\Delta T$ is uniformly determined based on the value of the temperature counter. However, the present invention is not limited to this. For example, the subtractive temperature may be alternatively determined based on a level of the temperature difference, which is obtained by subtracting the ambient temperature from the value of the temperature counter. Even in this way, the value of the temperature counter can be made generally equal to the ambient temperature.

Furthermore, in the present embodiment, each subtractive temperature data "a", "b" is set as the amount of temperature decrease for the recursive operation time. However, the present invention is not limited to this. For example, each subtractive temperature data "a", "b" may be set as the amount of temperature decrease for a unit time. In such an instance, the respective subtractive temperature data "a", "b" coincides, and the amount of temperature decrease, which is expressed as a product of the subtractive temperature data and an elapsed time measured since the time of ending the previous operation time, is subtracted every time the recursive operation time elapses.

The operational switch 4 is a rocker switch, which is operable in two steps and includes an opening switch, a closing switch and an automatic switch. When the vehicle occupant operates the operational switch 4, the command signal, which commands the opening or closing of the window glass 11, is outputted from the operational switch 4 to the controller 31.

Specifically, when one end of the operational switch 4 is operated, i.e., depressed or pulled one step, the opening switch is switched on. Thus, the operational switch 4 outputs a normal opening command signal to the controller 31 to perform a normal opening operation of the window glass 11, that is, to open. i.e., to lower the window glass 11 only through a period of operating the one end of the operational switch 4. Furthermore, when the other one end of the operational switch 4 is operated, i.e., depressed or pulled one step, the closing switch is switched on. Thus, the operational switch 4 outputs a normal closing command signal to the controller 31 to perform a normal closing operation of the window glass 11, that is, to close, i.e., to raise the window glass 11 only through a period of operating the other end of the operational switch 4.

As long as the normal opening command signal is received from the operational switch 4, i.e., as long as the one end of the operational switch 4 is operated, the controller 31 drives the motor 20 through the drive circuit 32 to open, i.e., to lower the window glass 11 in the normal manner. Furthermore, as long as the normal closing command signal is received from the operational switch 4, i.e., as long as the other one end of the operational switch 4 is operated, the controller 31 drives the motor 20 through the drive circuit 32 to close, i.e., to raise the window glass 11 in the normal manner.

Furthermore, when the one end of the operational switch 4 is operated further, i.e., depressed or pulled further to the second step, the opening switch and the automatic switch are both switched on. Thus, the operational switch 4 outputs an automatic opening command signal to the controller 31 to perform an automatic opening operation of the window glass 11, that is, to open, i.e., to lower the window glass 11 all the way to the full open position even if the operation of the one end of the operational switch 4 is stopped in the middle. Furthermore, when the other one end of the operational switch 4 is operated further, i.e., depressed or pulled further to the second step, the closing switch and the automatic switch are both switched on. Thus, the operational switch 4 outputs an automatic closing command signal to the controller 31 to perform an automatic closing operation of the window glass 11, that is, to close, i.e., to raise the window glass 11 all the way to the fully closed position even if the operation of the other one end of the operational switch 4 is stopped in the middle.

Furthermore, when the controller 31 receives the automatic opening command signal from the operational switch 4, the controller 31 drives the motor 20 through the drive circuit 32 to automatically open, i.e., to automatically lower the window glass 11 to the full open position. Also, when the controller 31 receives the automatic closing command signal from the operational switch 4, the controller 31 drives the motor 20 through the drive circuit 32 to automatically close, i.e., to automatically raise the window glass 11 to the fully closed position.

Next, with reference to FIGS. 5A to 5C, the operational modes of the controller 31 will be described in greater detail.

As described above, the controller 31 is operable in the active mode (the normal operational mode) or the sleep mode (the low power consumption operational mode). In the active mode, the controller 31 performs the drive control operation for controlling the operation of the motor 20 based on the operational signal received from the operational switch 4 and executes the program to perform the estimated temperature computing operation for computing the estimated temperature of the motor 20. The sleep mode is a power save mode where the minimum amount of electric power is consumed, for example, for maintaining of the current operational state, for returning to the active mode and for performing the estimated temperature computing operation, so that the entire system is substantially in the stop state.

In the present embodiment, the operational modes are categorized into the active mode and the sleep mode in terms of the operational electric power. Furthermore, in the present embodiment, the operational modes may be categorized into an estimated temperature computation performing mode and an estimated temperature computation non-performing mode in terms of performing or not performing the renewing operation of the estimated temperature.

Specifically, the active mode and the first sleep mode are categorized into the estimated temperature computation performing mode where the renewing operation of the estimated temperature is performed. Furthermore, the second sleep mode is categorized into the estimated temperature computation non-performing mode where the renewing operation of the estimated temperature is not performed.

Figure 5A:
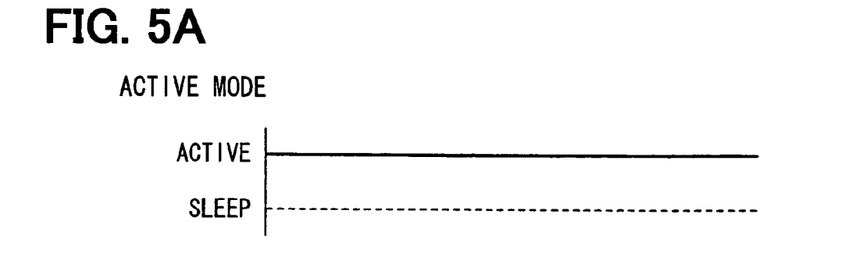
FIGS. 5A to 5C are descriptive diagrams showing operational modes of the controller.

FIG. 5A schematically indicates the active mode where the controller 31 is always in the operating state (the active state). In the active mode, the CPU 40 executes the operational program, which is stored in the memory 41, based on a clock signal supplied from a main clock 44. In the active state, as will be described below, the CPU 40 outputs an active signal ACT (a high level signal).

Figure 5B:
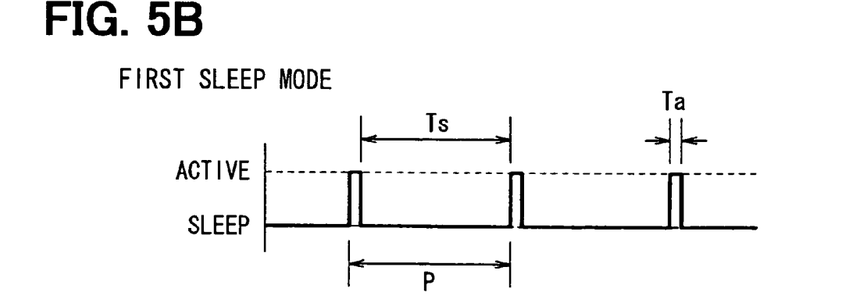

FIG. 5B schematically shows the first sleep mode. The CPU 40, which serves as a mode changing means, changes the operational mode of the controller 31 from the active mode to the first sleep mode when the CPU 40 receives the predetermined IG signal (an off signal), i.e., when the first sleep condition is satisfied. In the first sleep mode, the sleep time Ts and the active time Ta are alternately repeated.

The sleep time Ts is set to be sufficiently longer than the active time Ta. Therefore, in the first sleep mode, the controller 31 is placed in the stop state for most of the period of the first sleep mode, so that it is possible to save the electric power.

In the present embodiment, when the IG signal 5, which is supplied to the controller 31, is the off signal, which indicates the off state of the ignition switch, the operational mode of the controller 31 is changed from the active mode to the first sleep mode. However, the trigger for changing the operational mode to the fist sleep mode is not limited to this. For instance, this trigger may be a satisfaction of a predetermined condition during the motor stop period. For instance, the predetermined condition for changing the operational mode to the first sleep mode may be that a predetermined time has elapsed since the time of ending the operation of the motor 20 or alternatively that the estimated temperature reaches to a predetermined temperature during the motor stop period.

Figure 5C:
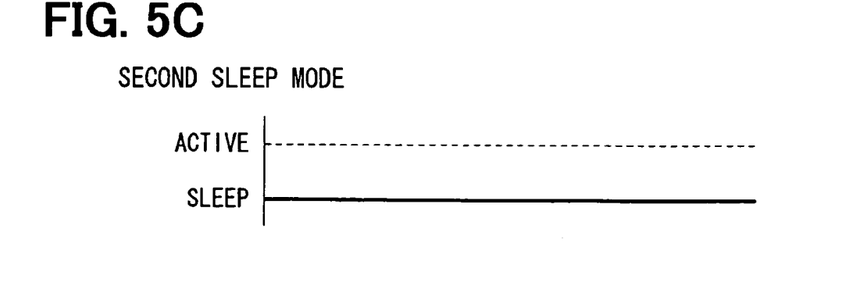

FIG. 5C schematically shows the second sleep mode. The CPU 40, which serves as the mode changing means, changes the operational mode of the controller 31 from the first sleep mode to the second sleep mode when a second sleep condition is satisfied during the operation in the first sleep mode.

In the present embodiment, when the estimated temperature, which is renewed during the operation in the first sleep mode, substantially coincides with the ambient temperature, which is sensed by the temperature sensor 33, i.e., when the second sleep condition is satisfied, the operational mode of the controller 31 is changed from the first sleep mode to the second sleep mode. In the second sleep mode, as shown in FIG. 5C, the controller 31 is always operated in the sleep state.

Thus, in the second sleep mode, the controller 31 stops the estimated temperature computing operation.

In the present embodiment, the second sleep condition is that the estimated temperature becomes substantially the same as the ambient temperature. However, the second sleep condition is not limited to this. For example, the operational mode of the controller 31 may be automatically changed to the second sleep mode upon elapse of a predetermined time since the time of starting the operation in the first sleep mode or alternatively upon elapse of a predetermined time since the time of stopping the motor.

As described above, in the first sleep mode, the active state and the sleep state are alternately repeated. In the sleep state, the CPU 40 stops the execution of the program.

In the second sleep mode, this sleep state is maintained.

In the present embodiment, when the CPU 40 receives a wakeup signal WU1 from the sleep control circuit 50 during the operation of the controller 31 in the first sleep mode, the CPU 40 returns the operation of the controller 31 to the active state, i.e., changes the operation of the controller 31 to the wakeup state only for a period of the active time Ta to execute the predetermined operation. Thereafter, the CPU 40 automatically returns the operation of the controller 31 to the sleep state.

Furthermore, when the CPU 40 receives an external signal (WU2), the CPU 40 returns from the sleep mode (the first sleep mode, the second sleep mode) to the active mode, i.e., changes the operation of the controller 31 to the wakeup state.

As shown in FIG. 3, when a predetermined return time (the sleep time Ts) elapses since the time of starting the sleep state during the operation of the controller 31 in the sleep mode (the first sleep mode), the sleep control circuit 50 generates the wakeup signal WU1, which commands the change of the operation from the sleep mode to the active mode. The sleep control circuit 50 includes a sub-clock 51, a counter 52, a register 53 and a signal generating circuit 54. The counter 52 and the register 53 are connected to the bus 43.

The counter 52 counts up each clock signal supplied from the sub-clock 51, which keeps its operation, as long as the electric power is supplied to the controller 31. The counter 52 periodically receives a clear signal CLR from the CPU 40 when the CPU 40 is operated in the active mode. When the counter 52 receives the clear signal CLR, the count value of counter 52 is reset.

Furthermore, during the operation in the second sleep mode, the counter 52 is always forcefully reset. That is, in the second sleep mode, the count value of the counter 52 is not incremented.

A preset count value of the clock signal, which corresponds to the sleep time Ts, is set in the register 53.

The signal generating circuit 54 includes a comparator 55 and an AND gate 56. The comparator 55 compares the count value of the counter 52 with the preset count value of the register 53. The AND gate 56 passes an output signal of the comparator 55 only during the period of the first sleep mode. The comparator 55 outputs the wakeup signal WU1 when the count value of the counter 52 exceeds the preset count value of the register 53. One of input terminals of the AND gate 56 receives the output signal of the comparator 55, and the other one of the input terminals receives an inverted signal that is supplied from an inverter 57, which inverts the active signal ACT outputted from the CPU 40 to generates the inverted signal.

In the active state, the CPU 40 continuously outputs the active signal ACT. The active signal ACT is the high level signal, and the output of the inverter 57 becomes the low level signal in the active state. Thus, in the active state, the AND gate 56 is disabled, so that the wakeup signal WU1, which is the high level signal, does not pass through the AND gate 56.

In contrast, in the sleep state, the CPU 40 does not output the active signal ACT, so that the input to the inverter 57 becomes the low level signal. As a result, the output of the inverter 57 becomes the high level signal. In this way, the AND gate 56 is enabled. In this state, when the wakeup signal WU1 is outputted from the comparator 55, the wakeup signal WU1 passes the AND gate 56.

The wakeup signal WU1, which is an interrupt signal, is supplied to an interrupt terminal of the CPU 40. In this way, the CPU 40 immediately returns from the sleep state to the active state, i.e., returns from the sleep state to the wakeup state according to a predetermined processing. After returning to the active state, the CPU 40 performs the computing operation of the estimated temperature until the active time Ta elapses and then returns to the sleep state once again.

In the second sleep mode, the counter 52 is always placed in the reset state, so that the wakeup signal WU1 is not outputted from the comparator 55 to the AND gate 56. Therefore, in the second sleep mode, the wakeup signal WU1 is not outputted from the signal generating circuit 54, and the CPU 40 is maintained in the sleep state.

The sleep control circuit 50 and the CPU 40 correspond to a starting means of the present invention.

Furthermore, the wakeup signal WU2, which is the externally generated interrupt signal, is supplied to the CPU 40. In the present embodiment, when the operational switch 4 is operated, the wakeup signal WU2 is supplied to the interrupt terminal of the CPU 40. When the wakeup signal WU2 is supplied to the CPU 40, the CPU 40 immediately returns from the sleep mode (the first sleep mode, the second sleep mode) to the active mode and controls the operation of the motor 20 according to the normal program processing.

Next, with reference to FIG. 6, the computing operation of the estimated temperature at the time of operation in the active mode during the motor stop period will be described.

First, at step S1, it is determined whether the first sleep condition is satisfied. In the present embodiment, the CPU 40 determines an ON/OFF state of the ignition switch of the vehicle based on the IG signal 5. Specifically, when the IG signal 5 is the OFF signal, it is determined that the ignition switch is in the OFF state (i.e., being switched off). In contrast, when the IG signal 5 is the ON signal, it is determined that the ignition switch is in the ON state (i.e., being switched on). In this operation, it is determined whether the operational mode needs to be changed from the active mode to the first sleep mode. When the IG signal 5 is the OFF signal (i.e., Yes at step S1), control proceeds to step S2. At step S2, the CPU 40 stops the outputting of the active signal ACT and outputs the clear signal CLR to reset the counter 52, and thereby the CPU 40 changes the operational mode to the first sleep mode.

Here, it may be possible that the controller 31 enables the operation of the motor 20 based on the operational signal from the operational switch 4 to enable the raising and lowing of the window glass 11 before elapse of a predetermined time (e.g., several tens of seconds) since the time of changing the IG signal 5 to the OFF signal. In such a case, it may be possible that the operational mode is changed to the first sleep mode after the elapse of the predetermined time since the time of changing the IG signal 5 to the OFF signal, which results in Yes at step S1.

Returning to step S1 of FIG. 6, when the IG signal 5 is the ON signal (i.e., No at step S1), control proceeds to step S3. At step S3, the CPU 40 determines whether a temperature estimation computation time Tr has elapsed. The temperature estimation computation time Tr is an elapsed time, which has been measured since the time of ending the previous renewing operation of the estimated temperature in the active mode. Specifically, in the present embodiment, the renewing operation of the estimated temperature is performed every time the temperature estimation computation time Tr elapses.

In the case where the temperature estimation computation time Tr has not elapsed (i.e., No at step S3), the current process is terminated, and the process returns to step S1 once again.

In contrast, when the temperature estimation computation time Tr has elapsed (i.e., Yes at step S3), control proceeds to step S4. At step S4, the renewing operation of the estimated temperature is performed by executing the estimated temperature computation process, and control returns to step S1.

Figure 7:
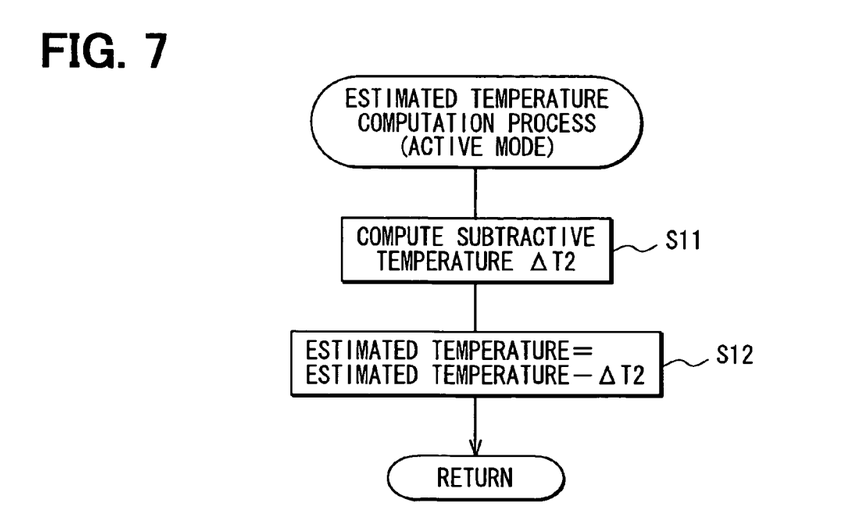
FIG. 7 is a flowchart showing the computing operation of the estimated temperature in the active mode.

FIG. 7 shows the renewing operation of the estimated temperature in the active mode (step S4). In this renewing operation, the CPU 40 computes a correction value (a subtractive temperature $\Delta T2$) at step S11. In this operation, the current value of the temperature counter is read (retrieved), and the corresponding subtractive temperature $\Delta T2$, which corresponds to the current value of the temperature counter, is computed based on the subtractive temperature data "b".

Then, the CPU 40 performs the renewing operation of the temperature counter at step S12. In this operation, the computed subtractive temperature $\Delta T2$ is subtracted from the retrieved value of the temperature counter, and its resultant value (the new estimated temperature) is rewritten in, i.e., is stored in the temperature counter.

In this way, the CPU 40 renews the value of the temperature counter in the active mode after the stopping of the motor until the fist sleep condition is satisfied.

Figure 8:
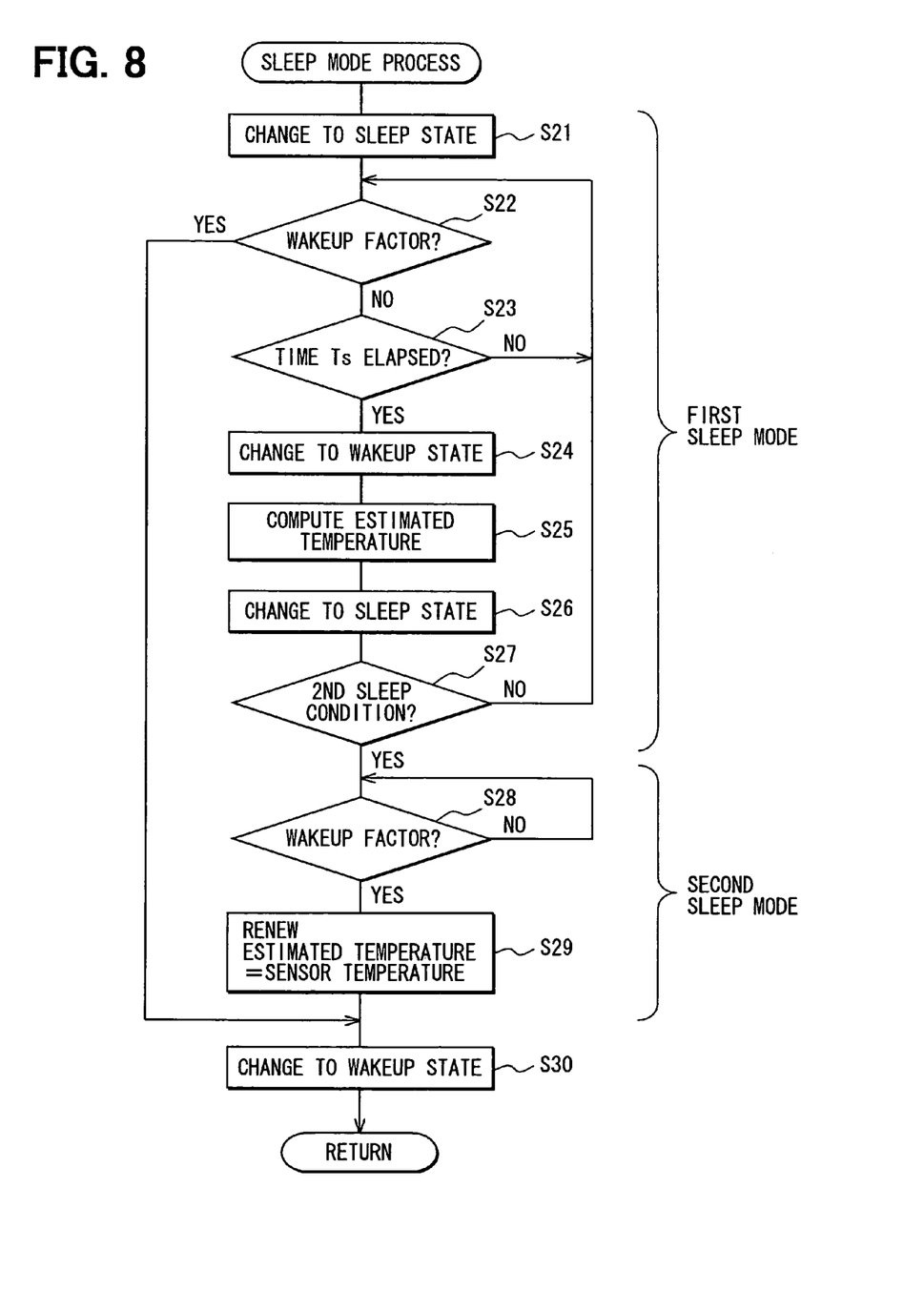
FIG. 8 is a flowchart showing a computing operation of an estimated temperature in a sleep mode.

Next, the flow of the operation in the sleep mode (step S2) will be described with reference to FIG. 8.

Figure 6:
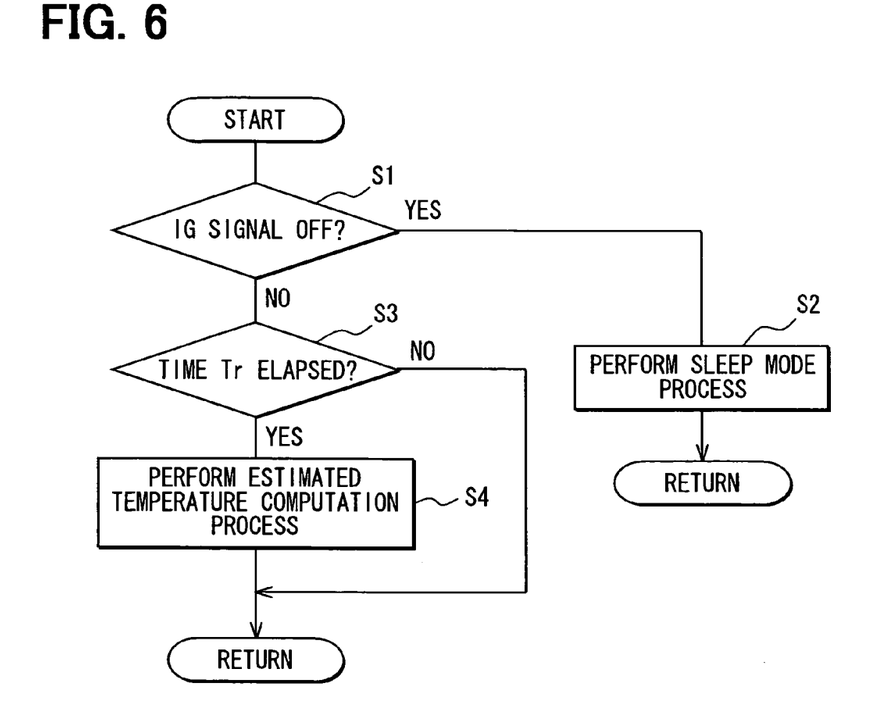
FIG. 6 is a flowchart showing a computing operation of an estimated temperature in an active mode.

Here, it has been already determined that the first sleep condition is satisfied (i.e., Yes at step S1 of FIG. 6). Thus, in the sleep mode process, the CPU 40 changes the operational state to the sleep state to change the operational mode to the first sleep mode at step S21.

At step S22, the CPU 40 determines whether a wakeup factor is present. Specifically, the CPU 40 determines whether the wakeup signal WU2, which is the externally generated interrupt signal, is present.

When the wakeup factor is present (i.e., Yes at step S22), control proceeds to step S30. At step S30, the wakeup process for returning to the active mode is performed, and the current process is terminated. In this way, the CPU 40 starts the operation in the active mode.

In contrast, when the wakeup factor is not present (i.e., No at step S22), control proceeds to step S23. At step S23, it is determined whether the sleep time (the temperature estimation computation time) Ts has elapsed. Measurement of the sleep time Ts starts at the time of returning to the sleep state after the previous renewing operation of the estimated temperature in the first sleep mode. Specifically, in the present embodiment, the renewing of the temperature counter is performed every sleep cycle P, which is the sum of the sleep time Ts (e.g., 10 seconds) and the active time Ta (e.g., 4 milliseconds), in the first sleep mode.

In the present embodiment, at step S23, the controller 31, which is operated in the first sleep mode, performs a standby process for waiting the wakeup signal WU1. In the sleep state, the CPU 40 does not output the active signal ACT. Thus, when the sleep time Ts elapses, the wakeup signal WU1, which is outputted from the comparator 55, passes the AND gate 56 and is then inputted to the CPU 40.

In the present embodiment, when the CPU 40 receives the wakeup signal WU1 in the sleep state, the CPU 40 is activated and starts the operation. However, the present invention is not limited to this. For example, the CPU 40 may be kept in the activated state in the sleep state and may always monitor whether the wakeup signal WU1 is inputted to the CPU 40.

When the CPU 40 does not receive the wakeup signal WU1 (i.e., No at step S23), the sleep time Ts has not elapsed yet, so that steps S22 and S23 are repeated once again.

In contrast, when the CPU 40 receives the wakeup signal WU1 (i.e., Yes at step S23), control proceeds to step S24 where the CPU 40 returns to the active state (wakeup state) at step S24. Then, control proceeds to step S25 where the CPU 40 performs the renewing operation of the estimated temperature.

Figure 9:
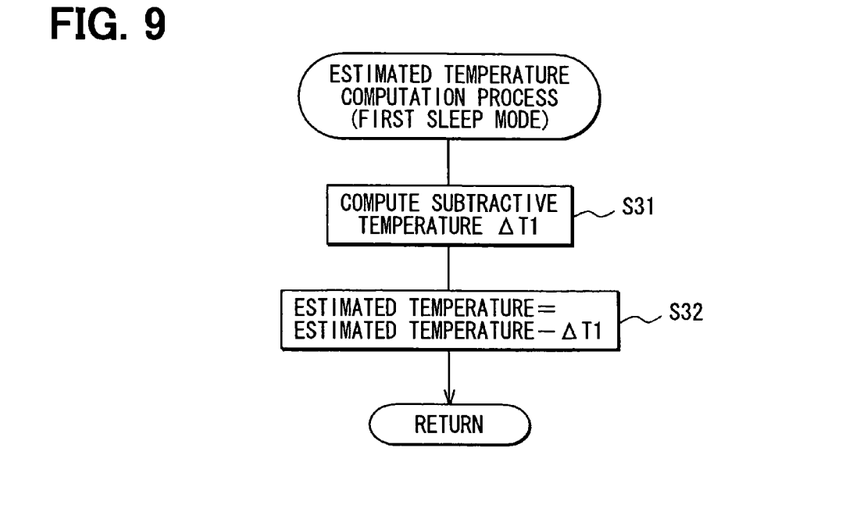
FIG. 9 is a flowchart showing the computing operation of the estimated temperature in the sleep mode.

FIG. 9 shows the flow of the renewing operation of the estimated temperature in the first sleep mode (step S25). As shown in FIG. 9, in the present embodiment, the CPU 40 performs the computing operation of the correction value (the subtractive temperature $\Delta T1$) at step S31. In this operation, the current value of the temperature counter is read (retrieved), and the corresponding subtractive temperature $\Delta T1$, which corresponds to the current value of the temperature counter, is computed based on the subtractive temperature data "a".

Then, the CPU 40 performs the renewing operation of the temperature counter at step S32. In this operation, the computed subtractive temperature $\Delta T1$ is subtracted from the retrieved value of the temperature counter, and its resultant value (the new estimated temperature) is rewritten in the temperature counter.

Returning to FIG. 8, at step S26, the CPU 40 outputs the clear signal CLR to reset the counter 52 and to return to the sleep state, so that the CPU 40 returns to the sleep state once again after the elapse of the active time Ta since the time of returning to the active state.

In this way, the CPU 40 renews the value of the temperature counter every time the predetermined time elapses in the first sleep mode during the motor stop period.

Thereafter, the CPU 40 determines whether the second sleep condition is satisfied at step S27. In the present embodiment, at step S27, the CPU 40 compares the renewed value (the renewed estimated temperature) of the temperature counter with the ambient temperature, which is computed based on the ambient temperature measurement signal received from the temperature sensor 33. When the difference between the value of the temperature counter and the ambient temperature is equal to or less than a predetermined temperature difference, i.e., when the second sleep condition is satisfied, it is determined that the value of the temperature counter is substantially the same as the ambient temperature.

When the difference between the value of the temperature sensor and the ambient temperature is greater than the predetermined temperature difference (i.e., No at step S27), the value of the temperature counter is not determined as generally the same as the ambient temperature, and thereby control returns to step S22 to repeat the renewing of the value of the temperature counter until the value of the temperature counter becomes generally the same as the ambient temperature.

As described above, in the fist sleep mode after the changing of the operation to the sleep state at step S21, the renewing of the value of the temperature counter at steps S22 to S27 is repeated.

In contrast, when the value of the temperature counter is substantially the same as the ambient temperature (i.e., Yes at step S27), the second sleep condition is satisfied, so that the operation is changed from the first sleep mode to the second sleep mode.

At step S28, the CPU 40 determines whether the wakeup factor is present. Specifically, similar to step S22, the CPU 40 determines whether the wakeup signal WU2, which is the interrupt signal, is inputted to the CPU 40.

At this time, when the wakeup signal WU2 is not inputted to the CPU 40 (i.e., No at step S28), the CPU 40 repeats step S28 until the wakeup signal WU2 is inputted to the CPU 40. During this period, the controller 31 is kept in the sleep state (the second sleep mode).

In contrast, when the wakeup signal WU2 is inputted to the CPU 40 (i.e., Yes at step S28), the CPU 40 renews the value of the temperature counter to the value of the ambient temperature, which is computed based on the latest ambient temperature measurement signal received from the temperature sensor 33, at step S29.

Then, at step S30, the CPU 40 returns to the active state and thereby returns to the normal mode (the active mode).

Second Embodiment

Next, a second embodiment of the present invention will be described. In the following description, the components similar to those of the first embodiment will be indicated with the same numerals and will not be described further for the sake of simplicity.

In the first embodiment, the condition (the first sleep condition) for changing from the active mode to the first sleep mode is that the predetermined IG signal (the OFF signal), which indicates the state of the ignition switch, is inputted to the controller 31. However, the present invention is not limited to this. For example, the condition (the first sleep condition) for changing from the active mode to the first sleep mode may be set as an elapsed time since the time of stopping the rotation of the motor 20. In the second embodiment, it is determined whether the active mode needs to be changed to the first sleep mode based on the elapsed time since the time of stopping the rotation of the motor 20. The differences with respect to the first embodiment will be described with reference to FIG. 10.

Figure 10:
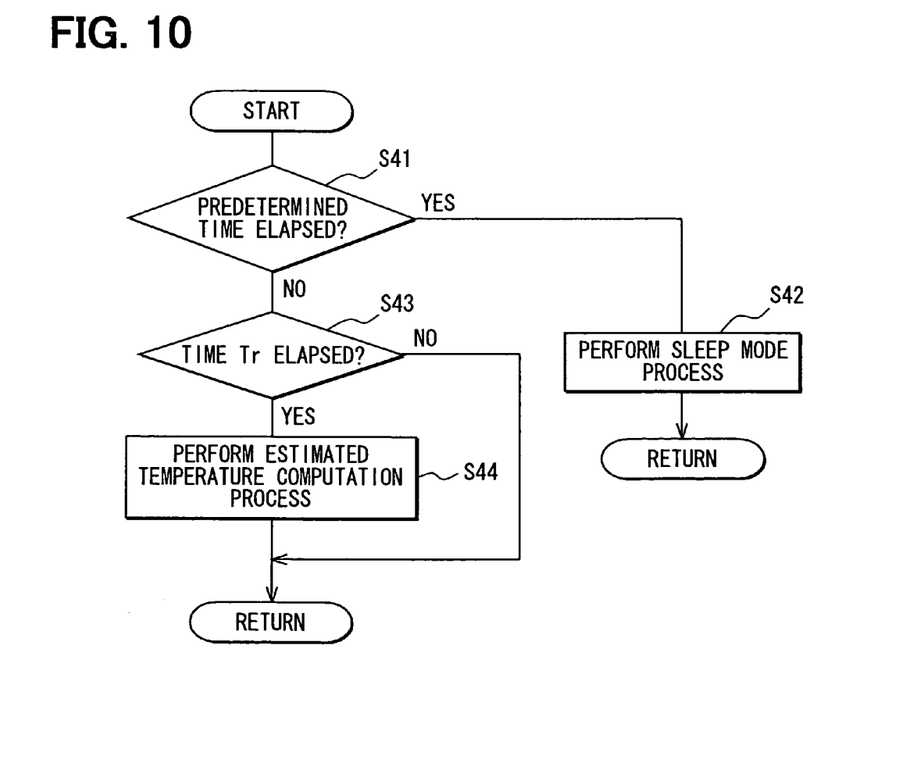
FIG. 10 is a flowchart showing a computing operation of an estimated temperature in an active mode according to a second embodiment of the present invention.

First, at step S41, the CPU 40 determines whether a predetermined time has elapses since the time of outputting the control signal for driving the motor 20 through the drive circuit 32 based on the clock signals received from the main clock 44 to determine whether the first sleep condition is satisfied. That is, it is determined whether the predetermined time has elapsed since the time of stopping the rotation of the motor 20 in the normal operation. In this operation, it is determined whether the operational mode needs to be changed from the active mode to the first sleep mode. When the predetermined time has elapsed since the time of stopping the operation of the motor (i.e., Yes at step S41), control proceeds to step S42. At step S42, the CPU 40 stops the outputting of the active signal ACT and outputs the clear signal CLR to reset the counter 52, so that the operation is changed to the first sleep mode (step S42).

When the first sleep condition is not satisfied (i.e., No at step S41), control proceeds to step S43. At step S43, the CPU 40 determines whether the temperature estimation computation time Tr has elapsed. The temperature estimation computation time Tr is an elapsed time, which has been measured since the time of ending the previous renewing operation of the estimated temperature in the active mode. Specifically, in the present embodiment, the renewing operation of the estimated temperature is performed every time the temperature estimation computation time Tr elapses.

In the case where the temperature estimation computation time Tr has not elapsed (i.e., No at step S43), the current process is terminated, and the process returns to step S41 once again.

In contrast, when the temperature estimation computation time Tr has elapsed (i.e., Yes at step S43), control proceeds to step S44. At step S44, the renewing operation of the estimated temperature is performed, and control returns to step S41.

In the present embodiment, in this way, the CPU 40 renews the value of the temperature counter in the active mode after the stopping of the motor until the fist sleep condition is satisfied. The operation of the first sleep mode (step S42) and the estimated temperature computing operation (step S44) are substantially the same as step S2 and step S4, respectively, of the first embodiment.

The above embodiments may be modified as follows.

In the above embodiments, the sleep condition, which is the condition for changing from the first sleep mode to the second sleep mode, is that the temperature difference between the value (the estimated temperature) of the temperature counter and the ambient temperature becomes equal to or less than the predetermined temperature difference. However, the present invention is not limited to this. For example, the second sleep condition may be that a predetermined mode change time (e.g., 10 minutes) has elapsed since the time of stopping the motor.

At this time, the motor change time may not be set as a fixed value and may be set variably based on the estimated temperature at the time of stopping the motor. For example, when the temperature at the time of stopping the motor is relatively high, the motor change time may be lengthened. In contrast, when temperature at the time of stopping the motor is relatively low, the motor change time may be shortened. Furthermore, the mode change time may be set according to a difference between the estimated temperature at the time of stopping the motor and the ambient temperature. In this way, it is possible to eliminate the process of comparing the estimated temperature with the ambient temperature.

Furthermore, in the above embodiment, the operational mode is changed from the active mode to the second sleep mode via the first sleep mode. However, the present invention is not limited to this. For example, when the second sleep condition is satisfied in the active mode, the operational mode may be directly changed from the active mode to the second sleep mode without passing through the first sleep mode. Specifically, during the operation in the active mode after the time of stopping the motor, when a predetermined mode change time elapses since the time of stopping the motor or when the estimated temperature becomes substantially the same as the ambient temperature, the active mode may be changed to the second sleep mode.

Furthermore, in the above embodiments, the sleep control circuit 50, which changes the operational mode from the sleep mode to the active mode, is provided separately from the CPU 40. However, the present invention is not limited to this. For example, the CPU 40 may include the function of the sleep control circuit 50.

Furthermore, in the above embodiments, the present invention is implemented in the power window system 1. However, the present invention is not limited to this. Specifically, the present invention may be implemented in any other suitable system or apparatus, which includes a motor.

Additional advantages and modifications will readily occur to those skilled in the art. The invention in its broader terms is therefore not limited to the specific details, representative apparatus, and illustrative examples shown and described.

What is claimed is:

1. A motor control system comprising:
    a motor that is powered by an electric power supplied from a vehicle electric power source;
    a control apparatus that controls an operation of the motor; and
    an ambient temperature sensing apparatus that senses an ambient temperature around the motor, wherein:
    the control apparatus includes an estimated temperature computing means for computing an estimated temperature of the motor;
    the estimated temperature computing means is operable in one of a plurality of operational modes, which include an estimated temperature computation performing mode for performing the computing of the estimated temperature of the motor and an estimated temperature computation non-performing mode for stopping the computing of the estimated temperature of the motor; and
    the estimated temperature computing means changes an operational mode thereof from the estimated temperature computation performing mode to the estimated temperature computation non-performing mode according to a predetermined condition in a stopped state of the motor.

2. The motor control system according to claim 1, wherein the estimated temperature computing means changes the operational mode thereof from the estimated temperature computation performing mode to the estimated temperature computation non-performing mode when a difference between the estimated temperature of the motor and the ambient temperature, which is sensed by the ambient temperature sensing apparatus, becomes equal to or less than a predetermined value after the stopping of the motor.

3. The motor control system according to claim 1, wherein the estimated temperature computing means changes the operational mode thereof from the estimated temperature computation performing mode to the estimated temperature computation non-performing mode after a predetermined mode change time elapses since the time of stopping the motor.

4. The motor control system according to claim 3, wherein the estimated temperature computing means sets the predetermined mode change time based on the estimated temperature of the motor, which is obtained when the motor is stopped.

5. The motor control system according to claim 1, wherein the estimated temperature computing means sets the ambient temperature, which is sensed by the ambient temperature sensing apparatus, as the estimated temperature of the motor and then starts the computing of the estimated temperature of the motor when the estimated temperature computing means changes the operational mode thereof from the estimated temperature computation non-performing mode to the estimated temperature computation performing mode.

6. The motor control system according to claim 1, wherein the estimated temperature computing means uses at least one of a rotational speed of the motor and a consecutive operation time of the motor to compute the estimated temperature of the motor.

7. The motor control system according to claim 1, wherein the estimated temperature computing means changes the operational mode thereof to the estimated temperature computation non-performing mode when the control apparatus receives a signal, which indicates an OFF state of an electric power state of the vehicle.

* * * * *